United States Patent

[11] 3,586,098

[72] Inventor Gert Wellensiek
 Hoesel, Germany
[21] Appl. No. 8,841
[22] Filed Feb. 5, 1970
[45] Patented June 22, 1971
[73] Assignee The American Schack Company Inc.
 Pittsburgh, Pa.

[54] CONCENTRIC TUBE HEAT EXCHANGER
 9 Claims, 5 Drawing Figs.
[52] U.S. Cl. ..................................... 165/142,
 263/20, 165/134
[51] Int. Cl. ...................................... F28d 7/12
[50] Field of Search ........................... 126/91 A;
 165/142, 134, 135

[56] References Cited
 UNITED STATES PATENTS
3,007,681 11/1961 Keller ........................ 165/142 X
3,078,919 2/1963 Brown, Jr. .................. 263/20 X
3,446,279 5/1969 White et al. ................ 263/20 X Primary Examiner—Frederick L. Matteson
Assistant Examiner—Theophil W. Streule
Attorney—Stanley J. Price, Jr.

ABSTRACT: A multistage recuperator-type heat exchanger has a plurality of recuperator tubes suspended in an elongate recuperator chamber through which a heating gas flows. Each of the recuperator tubes has an inner tube concentrically positioned in an outer tube. The outer tube has a closed bottom end portion and an open upper end connected to a heated gas outlet compartment of a header. The inner tube has an open bottom end portion that terminates adjacent the closed bottom end of the outer tube and an open upper end connected to an inlet compartment of the header through which gas to be heated is introduced into the inner tube. The gas to be heated flows downwardly through the inner tube to the open bottom end upwardly in the annular passageway between the tubes and absorbs heat from the inner surface of the outer tube. Some of the recuperator tubes adjacent the heating gas inlet end of the recuperator, where the heating gas is at its highest temperature, have groups of spaced apertures therethrough around the circumference of the tube. The groups of apertures are located at different elevations along the length of the tube. A portion of the gas to be heated flows outwardly through the apertures and sweeps the inner surface of the outer tube at the different elevations and absorbs the heat from the outer tube and reduces the temperature thereof.

PATENTED JUN 22 1971
3,586,098
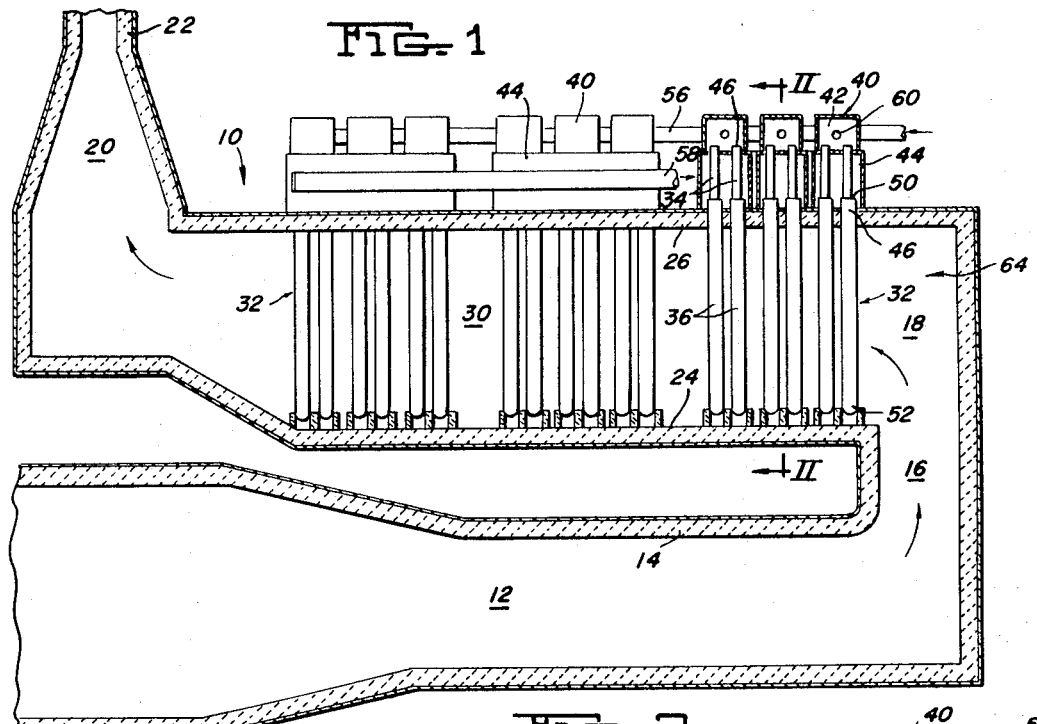
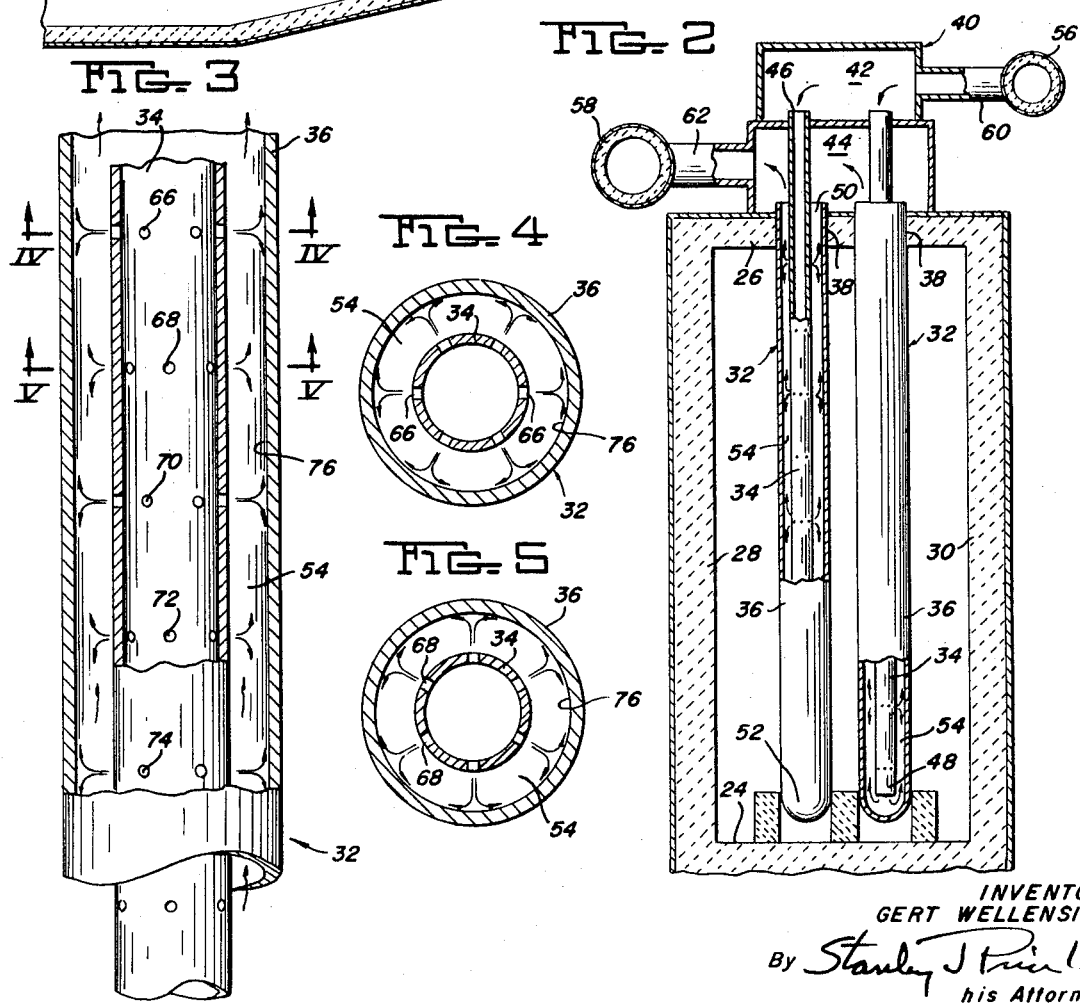
INVENTOR
GERT WELLENSIEK
By Stanley J. Price
his Attorney

CONCENTRIC TUBE HEAT EXCHANGER

BACKGROUND OF THE INVENTION

1. Field of the Invention

This invention relates to concentric tube heat exchangers and more particularly to recuperator-type heat exchangers where the outer tube is heated by a heating fluid and another fluid is heated in the annular space between the concentric tubes.

2. Description of the Prior Art

Metallic recuperators employing a series of concentric tube heat exchangers are used to reclaim heat from the waste gases of industrial heating furnaces and preheat the air for combustion in such furnaces or preheat other gases for industrial uses. The waste or combustion gases at high temperatures enter the recuperator chamber in which the tubes are suspended and cause damage to the metallic recuperator tubes. It has been suggested in the past to add cooling air to the hot gases entering the recuperator chamber to lower the temperature of the incoming waste gases. It has also been suggested, as disclosed in U.S. Pat. No. 3,157,228, to lower the temperature of the waste gases entering the recuperator chamber by spraying a liquid medium into the stream of waste gas. The addition of cooling air to the waste gas may cause secondary combustion in the recuperator chamber and the use of water or other liquid cooling media subject the outer tubes adjacent the waste gas inlet end of the recuperator to uneven temperatures and impart undue stresses to the recuperator tubes. The treatment of the waste gas to lower the waste gas temperature reduces the efficiency of the heat exchange system and limits the amount of heat that can be transferred to the gas being heated.

SUMMARY OF THE INVENTION

The present invention relates to a heat exchanger having a pair of concentric tubes with an annular heat exchange passageway therebetween. The inner tube has an open upper portion connected to a source of air to be heated and an open lower portion. The outer tube has an open upper end portion, a closed lower end portion and an outer surface subjected to a gas at an elevated temperature. The inner tube is concentrically positioned in the outer tube with the lower end portion adjacent the outer tube closed lower end portion. The inner tube has a plurality of spaced groups of apertures around the circumference of the inner tube. The groups of apertures are located at different elevations along the length of the tube so that a portion of the cool gas flows outwardly through the aperture in the tube and sweeps the inner surface of the outer tube to absorb heat therefrom and thus reduce the temperature of the outer tube.

Accordingly, the principal object of this invention is to provide a concentric tube heat exchanger arranged to control the temperature of the outer tube.

Another object of this invention is to provide a multistage recuperator type heat exchanger where the outer tubes adjacent the inlet end of the recuperator chamber are cooled by the gas to be heated.

A further object of this invention is to increase the heat exchange efficiency between the gases by utilizing waste combustion gas at high temperatures without either dilution or cooling.

These and other objects and advantages of this invention will be more completely disclosed and described in the following specification, the accompanying drawings and the appended claims.

BRIEF DESCRIPTION OF THE DRAWINGS

FIG. 1 is a vertical section of a typical industrial furnace with a recuperator chamber positioned above the hearth portion of the furnace.

FIG. 2 is a view in section taken along the line II–II of FIG. 1 illustrating the concentric tube heat exchanger partially in section.

FIG. 3 is a fragmentary view in elevation and section of the concentric tubes illustrating the plurality of groups of apertures in the inner tube with the groups located at different elevations along the length of the inner tube.

FIGS. 4 and 5 are views in section taken along the lines IV–IV and V–V in FIG. 3.

DESCRIPTION OF THE PREFERRED EMBODIMENTS

Referring to FIG. 1, the numeral 10 generally designates an industrial furnace having a hearth portion 12 with a roof 14. The hot waste gases of combustion flow through the hearth 12 in the direction of the arrow and are exhausted through a vertical passageway 16 into a recuperator chamber 18. The hot gases flow through the elongated recuperator chamber 18 into passage 20 and out of the furnace through stack 22.

The recuperator chamber 18 has a floor 24, a roof 26 and sidewalls 28 and 30. A plurality of recuperator tubes generally designated by the numeral 32 are suspended in the recuperator chamber 18 and are arranged in pairs across the recuperator chamber 18 and transfer heat from the hot waste gas flowing through the recuperator chamber to air or other industrial gases flowing through the tubes 32.

The recuperator tubes 32 include an inner tube 34 and an outer tube 36. The outer tube extends through an aperture 38 in the recuperator chamber roof 26 and the inner and outer tubes 34 and 36 are suitably secured in a header box generally designated by the numeral 40 that has a cold gas chamber 42 and a heated gas chamber 44. The inner tube 34 has an open upper end portion 46 extending into cold air compartment 42 of header 40. The inner tube 34 has an open bottom end portion 48 so that the gas to be heated in chamber 42 flows downwardly through the inner tube 34 and out through the lower open end 48. The outer tube 36 has an open upper end portion 50 extending into chamber 44 of header 40 and a closed lower end portion 52 adjacent the recuperator chamber floor 24. The inner tube 34 is concentrically positioned within the outer tube 36 and the tubes are so dimensioned that there is an annular passageway 54 therebetween. Lower end portion 48 terminates above the closed end portion 52 of tube 38 so that the cold gas flowing downwardly through inner tube 34 exhausts therefrom through the lower end portion 48 and flows upwardly through the annular passageway 54 and is discharged through the upper open end 50 of outer tube 38 into chamber 44 of header 40.

Longitudinally extending conduits 56 and 58 are connected to the respective header compartments 42 and 44 by transverse conduits 60 and 62 so that gas to be heated is supplied through conduit 56 to the upper chambers 42 of the plurality of headers 40 positioned on the upper surface of the recuperator chamber roof 26. Similarly, heated air is withdrawn from the chambers 44 of all of the headers 40 through branch conduit 62 into main conduit 58 through which the heated gas is conveyed from the recuperator chamber.

The waste combustion gas flowing from the hearth 12 upwardly through the gas outlet passage 16 is at its highest temperature adjacent the inlet end 64 of the recuperator chamber 18. The depending recuperator tubes 32 positioned adjacent the recessed chamber inlet end 64 are subjected to these waste gases at these inordinately high temperatures. At times the temperature of the gas is so high that the outer tubes 36 subjected to these high temperatures burn out.

The gas to be heated flowing downwardly through a conventional recuperator tube leaves the inner tube adjacent the outer tube closed end portion 52 and contacts the inner surface of the outer tube 36 adjacent the outer tube closed end portion 52. The gas is quickly heated in the annular passageway 54 adjacent the base 52 of outer tube 36 and is soon heated to an elevated temperature approaching the temperature of the outer tube shortly after the gas leaves the bottom of the inner tube 34 so that the gas to be heated exerts little, if any, cooling to the intermediate or upper portions of outer tube 36. The intermediate and upper portions of outer tubes 36 adjacent the recuperator chamber inlet portion 64 are thus subjected to extremely high temperatures and burnout of the tubes is accelerated.

In accordance with the present invention the recuperator tubes 32 adjacent the inlet end 64 of the recuperator chamber 18 have a plurality of groups of spaced apertures. The groups are generally designated by the numerals 66, 68, 70, 72 and 74, and are illustrated in FIG. 3. The groups each contain a plurality of apertures of passageways through the inner tube 34 around the circumference of the inner tube and preferably symmetrically spaced as illustrated in FIGS. 4 and 5. Where desired, an unsymmetrical arrangement may be used with the greater number of apertures facing the incoming stream of hot waste gas. The groups of apertures 66, 68, 70, 72 and 74 extend around the circumference of the inner tube 34 and provide jet-type outlet openings for the gas flowing downwardly through the inner tube 34. The outlet openings are provided at different elevations above the base or lower portion of outer tube 36. With this arrangement, a portion of the gas flowing downwardly through the inner tube 34 is discharged at an increased velocity through the apertures in the respective groups 66, 68, 70, 72 and 74 and the streams of gas flowing through the apertures sweep the inner wall 76 of outer tube 36, as is illustrated diagrammatically in FIGS. 3, 4 and 5. The gas discharged through the group of apertures 66 is at a low temperature substantially the temperature of the gas at the inlet header 42, and as the cold gas sweeps the inner surface 76 of outer tube 36, the gas absorbs heat from the outer tube 36 and in doing so cools the outer tube to maintain the temperature of the outer tube below a safe temperature. The gas flowing outwardly through groups of apertures 66, 68, 70, 72 or 74 is also at a relatively low temperature as compared with the temperature of the gas in the outlet compartment 44 of header 40 so that the gas discharged therefrom and sweeping across the outer tube inner surface 76 absorbs heat therefrom and cools the outer tube. The remainder of the gas to be heated, not discharged through the groups of apertures 66, 68, 70, 72 and 74, is discharged through the lower opening 48 of inner tube 34 into the annular passageway 54 and flows upwardly therethrough to also absorb heat from the surface 76 of outer tube 36.

The extent of the cooling effect will depend on many variables such as the volume and velocity of the air to be heated, the dimensions of the inner and outer tubes, the velocity and temperature of the waste gas and the location, size and number of apertures in the groups. An example of how the outer tube adjacent the upper portion is cooled by the cold gas discharged through a group of apertures is as follows. Air at ambient temperature is introduced into the inner tube 34 and is discharged from the bottom outlet 48 at a temperature of about 50° C. When the outer tube is heated to a temperature of about 680° C. the air to be heated attains a temperature of about 635° C. adjacent the base of the outer tube 36 so that little if any heat exchange occurs adjacent the upper portion of the tube. Where, however, the cold air at ambient temperature is discharged through the groups of apertures 66, 68, 70, 72 and 74, along the length of the tube, the temperature of the mixed air, that is the air flowing upwardly from the base of the outer tube 36 through passageway 54 and the air discharged through the groups of apertures 66, 68, 70, 72 and 74 for example, would be about 310° C. It is apparent at this temperature the mixed air at 310° C. instead of 635° C. would absorb a greater amount of heat from the outer tube inner surface 76 to cool and reduce the temperature of the outer tube along the length thereof.

It should be understood that the above discussed method of controlling the temperature of the outer tube is not intended to be restricted to the recuperator type of heat exchanger. For example, the jet-type discharge of the gas may be utilized in the chemical industry wherein it is desired to subject a gas to an elevated temperature and to immediately thereafter quench the gas to prevent thermal decomposition. With the previously discussed arrangement, the gas to be subjected to the elevated temperature is discharged through the groups of apertures and contacts the surface of a tube at the elevated temperature where it is momentarily subjected to the elevated temperature of the tube surface. The gas, however, is quickly swept away from the hot surface by other gas flowing upwardly through the annular passage and the gas is thus quenched to a temperature below the thermal decomposition temperature. Again the gas volumes and velocities, surface temperatures, number and sizes of the apertures all can be varied to control the time that the gas is subjected to the elevated temperature.

According to the provisions of the patent statutes, I have explained the principle, preferred construction and mode of operation of my invention and have illustrated and described what I now consider to represent its best embodiments.

I claim:

1. A recuperator heat exchanger comprising,
   an elongate recuperator chamber having an inlet portion and an outlet portion,
   means for introducing gaseous combustion products from an industrial furnace into the inlet end portion of said recuperator chamber and circulating gaseous combustion products through said recuperator chamber, said gaseous combustion products being at the highest elevated temperature within said recuperator chamber adjacent said recuperator chamber inlet portion,
   a plurality of headers spaced longitudinally along said recuperator chamber,
   said headers each having a plurality of recuperator tubes extending therefrom into said recuperator chamber,
   each recuperator tube including an inner tube positioned concentrically in an outer tube,
   said outer tube having one end communicating with said header and a closed end within said recuperator chamber,
   said inner tube concentrically positioned within said outer tube and having an end portion communicating with said header and the other end portion in close proximity to the closed end portion of said outer tube,
   a cold gas supply duct communicating through said header with said inner tube,
   a hot gas discharge duct communicating through said headers with said outer tube,
   means for establishing flow of cold gas from said headers through said inner tube to said end portion adjacent said outer tube closed end portion and then upwardly through said annular passage between the inner surface of said outer tube and the outer surface of said inner tube to said header and said hot gas discharge duct,
   said gaseous combustion products at side elevated temperature arranged to heat the outer tubes of said recuperator tubes so that said outer tubes transfer heat to said gas flowing upwardly between said inner tube and said outer tube, and
   means for introducing a portion of said cold gas in said recuperator tubes positioned in said recuperator chamber adjacent said recuperator chamber inlet at locations spaced upwardly from the closed end of said outer tube to cool portions of the outer tubes subjected to the highest elevated temperature of said gaseous combustion product.

2. A recuperator heat exchanger as set forth in claim 1 in which,
   certain of said inner tubes of said recuperator tubes positioned adjacent the inlet end portion of said recuperator chambers having openings therein between said inner tube end portions, said openings forming outlet passages into said annular passageway between said inner tube and said outer tube for a portion of said cold gas flowing downwardly in said inner tube.

3. A recuperator heat exchanger as set forth in claim 2 in which, said openings permit a portion of said cold gas to sweep across the inner surface of said outer tube and remove heat from said outer tube at a location above said closed end portion.

4. A recuperator heat exchanger as set forth in claim 2 in which, said openings include groups of spaced apertures around the circumference of said inner tubes so that said cold gas flowing therethrough sweeps across the inner circumference of said outer tube between said inner tube end portions.

5. A recuperator heat exchanger as set forth in claim 5 in which, said groups of spaced apertures are located at different elevations along the length of said inner tube so that said cold gas flows outwardly therefrom at different locations along the length of said outer tube.

6. A recuperator heat exchanger as set forth in claim 1 which includes, means to mix a portion of the incoming cold gas with the heated gas flowing upwardly through said annular passage between said tubes to reduce the temperature of said gas flowing upwardly through said annular passage and increase the rate of heat transfer between said outer tube and said gas flowing upwardly between said tubes at a location above the closed end of said outer tube.

7. A concentric tube heat exchanger comprising, an inner tube having an open upper end portion and an open lower end portion, an outer tube having an open upper end portion and a closed lower end portion, said inner tube positioned concentrically within said outer tube with said lower open end portion adjacent said outer tube closed end portion and forming an annular gas flow passageway between the outer surface of said inner tube and the inner surface of said outer tube, means to circulate a cold gas to be heated downwardly through said inner tube against the inner surface of said outer tube closed end portion and upwardly through said annular gas flow passageway and discharged through said outer tube open upper end portion, means to heat said outer tube to transfer heat therefrom to said gas flowing upwardly in said annular passageway, and means for introducing a portion of said cold gas into said annular gas flow passageway adjacent at least said outer tube upper portion to cool said tube upper portion.

8. A concentric tube heat exchanger as set forth in claim 7 in which, said inner tube includes a plurality of openings therein between said inner tube end portions, said openings forming outlet passages into said annular gas flow passageway for a portion of said cold gas flowing downwardly in said inner tube.

9. A concentric tube heat exchanger as set forth in claim 7 which includes means to mix a portion of said incoming cold gas with the heated gas flowing upwardly through said annular gas flow passageway to reduce the temperature of said gas flowing upwardly through said annular gas flow passageway and increase the rate of heat transfer between said outer tube and said gas flowing upwardly in said annular gas flow passageway at a location above the closed end portion of said outer tube.